Oct. 3, 1933.  R. N. BROWN  1,928,779
TRANSMISSION MECHANISM
Filed Jan. 19, 1932
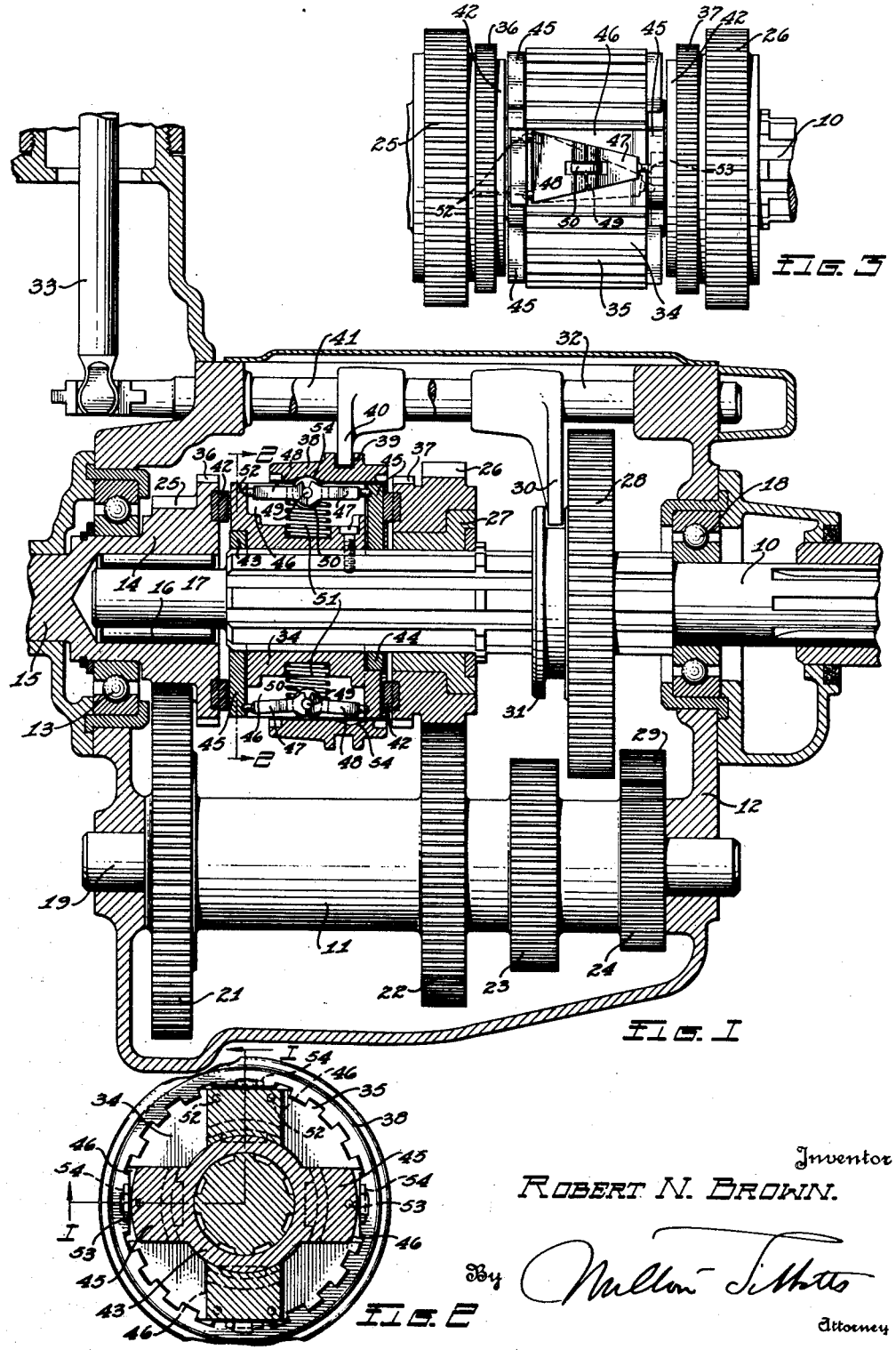

Patented Oct. 3, 1933

1,928,779

UNITED STATES PATENT OFFICE 1,928,779

TRANSMISSION MECHANISM

Robert N. Brown, Detroit, Mich., assignor to Packard Motor Car Company, Detroit, Mich., a corporation of Michigan Application January 19, 1932. Serial No. 587,542

11 Claims. (Cl. 192—53)

This invention relates to motor vehicles and more particularly to the transmission mechanism of such vehicles.

In the operation of motor vehicles, it is requisite to smooth gear changing that the gears which are to be meshed be brought to the same or substantially the same peripheral speed before engagement of the gear teeth. Thus after disconnection of the vehicle clutch and the previously meshed gears of a conventional transmission, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the contingencies of the vehicle operation may dictate, so that gear changing has come to be considered as perhaps the most difficult task incident to the operation of a motor vehicle.

To assist the operator in making rapid and quiet shifts, it has been previously proposed to synchronize the gears to be meshed by various means, such as friction clutches. Such devices, however, have been open to certain objections. The mechanisms employed have been in general, cumbersome and complicated. Frequently the friction elements have not been applied with sufficient pressure to effect proper synchronization within the very short time interval available for this purpose, or if so applied, the operating mechanism has been subjected to excessive wear. This has made it necessary to release the synchronizing means immediately upon engagement of the gears, which in turn requires delicate and complicated means to determine the exact time of application and of release.

One of the objects of this invention is to provide a motor vehicle transmission having an improved form of synchronizing device which is efficient, simple and effective.

Another object of the invention is to provide a motor vehicle transmission with synchronizing mechanism which is actuated through means of a novel form of toggle mechanism.

A further object of the invention is to provide a toggle means for actuating friction clutches to synchronize rotating members prior to engagement.

Other objects of the invention will appear from the following description taken in connection with the drawing, which forms a part of this specification, and in which:

Fig. 1 is a view, taken on line 1—1 of Fig. 2, partially in side elevation and partly in vertical section through a motor vehicle transmission constructed in accordance with the invention;

Fig. 2 is a view in section taken substantially on line 2—2 of Fig. 1;

Fig. 3 is a fragmentary plan view of one of the synchronizer toggle mechanisms in applied and unapplied positions with the friction clutches, the clutch ring being removed;

Referring to the drawing, in Fig. 1 is shown a motor vehicle transmission comprising a splined transmission shaft 10 and a countershaft or gear spool 11, mounted in a housing or transmission case 12. The front wall of the housing carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19, supported at its ends by the transmission case walls, and this spool is formed with a number of integral gears 21, 22, 23 and 24. Of these, the gear 21 is in constant mesh with a gear or pinion 25, formed on the enlarged end 14 of the shaft 15, so that the countershaft 11 is continuously connected to and driven from the clutch shaft 15 in the well known manner. The gear 22 is also continuously in mesh with a gear 26 which is mounted for rotation on a bearing sleeve 27, pressed or otherwise rigidly mounted on the shaft 10, as will be readily understood.

Gears 23 and 24 constitute the low speed and reverse gears respectively, and are adapted to drive the gear 28 which is splined to and slidable on the shaft 10, this gear 28 being directly engageable with the gear 23. It may be driven from the gear 24 through a reverse idler pinion 29 in the well known manner. Such sliding action is effected in the usual way by means of a shifter fork 30, which engages in a groove 31 in the body of the gear 28, this fork being actuated by a shifter rod 32 slidably mounted in suitable bearings in the upper part of the cover 110 portion of the casing 12. The shifter rod 32 is selectively actuated by a lever 33, of usual form, which may be manually operated by the vehicle driver in the well known manner. Thus in the illustrated embodiment of the invention, gear 28 may be moved to mesh with gear 23, to provide a first speed, or connected through pinion 29 to gear 24 to provide a reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is associated with the shaft between the gears 25 and 26. This device constitutes a splined hub portion 34 which is fixed on the splines of the shaft 10 and has an axially disposed rim portion which is provided with external splines or teeth 35 to which the positive clutch ring 38 is splined. The clutch ring 38 is slidably mounted on and surrounds the hub rim, and is provided with internal splines cooperating with the splines 35 and engageable with the clutch teeth 36 on the driving shaft when the ring is moved forwardly of the transmission, and engageable with the clutch teeth 37 on an extension of gear 26 when moved rearwardly thereof. To effect such sliding movement, the clutch ring is provided with a shifter groove 39, actuated by a shifter fork 40, which is connected to a shifter rod 41 similar to the rod 32 and likewise selectively operated by the gear shift lever 33. It will be evident that when the clutch ring is in engagement with the teeth 37, the constant mesh gear 26 is locked to the shaft 10, thus providing the second speed, and that when the teeth 36 are engaged with the clutch ring, the shafts 10 and 15 are directly coupled, thus providing the third speed which is a direct drive.

To perform the clutch operation just described without shock or clash, this invention provides a synchronizing device adapted to bring the pairs of clutch teeth 35—36 or 35—37 to the same speed before positive engagement through means of the clutch ring 38. For this purpose, I provide the adjacent ends of the clutch members 36 and 37 with friction ring members 42 which are fixed in recesses therein and which extend beyond the end faces thereof. Carried by the ends of the hub are friction rings 43 and 44 each having a pair of diametrically disposed arms 45, the arms of one ring being arranged at right angles relative to the arms of the other ring member. The ends of the hub are recessed to receive the ring members and their arms, however the members and their arms project beyond the end faces of the hub and the arms are adapted to frictionally engage the adjacent ring 42.

Toggle mechanisms, carried by the hub and associated with the friction rings 43 and 44, serve to move the ring arms into engagement with the rings 42 prior to engagement of the clutch ring with the clutch teeth 36 or 37. The hub is formed with four radial recesses 46 for the reception of the toggle mechanisms, and each toggle mechanism includes levers 47 and 48, a shaft 49 carrying a roller 50, and a coil spring 51. The toggle levers of each mechanism are arranged endwise in the recesses and the adjacent ends are curved to provide bearings which engage the associated shaft 49, the levers being cut out to accommodate the roller 50. The levers 48 terminate in a pair of spaced bearing or anchor pins 52 while the levers 47 terminate in a single bearing or anchor pin 53, and the pairs of levers are arranged so that the pair of pins 52 are seated in recesses in the hub 34 while the pins 53 are seated in recesses in the arms of the friction rings. It is therefore evident that the pairs of toggle levers are in reversed arrangement alternately around the hub.

The toggle mechanisms are enclosed by the clutch ring and the rollers are pressed thereagainst by the coil springs 51, the mechanisms thus having a substantially floating mounting in the recesses. The inner wall of the clutch ring, with which the rollers engage, is provided with recesses 54 so that when the rollers register therein the shafts 49 will be moved outwardly by the coil springs and the levers moved into alignment, thus increasing their total length and moving the associated friction ring arms 45 axially into engagement with the adjacent ring 42. When the rollers do not engage in the grooves 54, the associated shafts 49 are located further toward the hub axis than when the rollers are in the recesses and thus the overall length of the pair of levers associated therewith is shortened so that the associated friction ring is not effective.

The recesses 54 are alternately arranged adjacent opposite ends of the clutch ring and in a relation such that the toggle mechanisms will move the friction rings into engagement with the rings 42 prior to engagement of the clutch ring with the clutch teeth 36 or 37. Due to the alternate arrangement of the toggle mechanisms and the arrangement of the spline recesses, only two mechanisms are effective to actuate each ring member 43 or 44 and these are diametrically located. The bearing portions of the pairs of toggle levers are formed with slightly curved adjacent ends so that their engagement limits their articulation in both directions, as evidenced in Fig. 1.

The pair of toggle levers each form a substantially triangular structure, as viewed in plan. Movement of the clutch ring toward either clutch member 36 or 37 will allow the coil springs to move the rollers of two toggle mechanisms into recesses and thereby lengthen the associated toggle structures so that they press the arms of the associated ring 43 or 44 toward the adjacent ring 42 and into frictional engagement therewith. There is usually a difference in speed between the hub and the clutch members 36 or 37, with which the clutch ring is to engage and this friction ring engagement will synchronize the same prior to engagement of the clutch ring. However, prior to uniform rotation of the clutch members, the toggle levers causing the frictional engagement will be shifted laterally to the position shown in dotted lines in Fig. 3 due to the speed differential and will thus increase the frictional pressure exerted. The friction rings 43 and 44 can rotate relative to the hub, but such rotation is limited by the lateral shifting of the toggle levers which, due to the increased leverage, wedges the friction members together before the arms 45 reach the sides of their adjacent recess. In this manner a quick and firm frictional engagement takes place so that synchronization is assured irrespective of the speed at which the clutch ring is shifted.

It will be observed that after the synchronization occurs, further movement of the clutch ring into engagement with either clutch member 36 or 37 will ride the rollers out of the recesses which will depress the toggle levers and release the friction elements prior to positive clutching of the teeth 35 with the teeth 36 or 37.

The synchronizing device above described is associated with the hub so that the entire clutch structure can be readily assembled and installed. The action of the device is efficient and unfailing irrespective of the clutch shifting speed.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a transmission mechanism having a driving member and a driven member, a positive clutch member axially movable to connect said members, a friction clutch element axially movable to connect said driving and driven members in advance of the positive clutch connection, and means for shifting said friction clutch element including toggle mechanism, said mechanism being controlled by frictional engagement therewith of said positive clutch member.

2. In a transmission mechanism having a driving member and a driven member, a positive clutch device including a recessed hub fixed to one of said members and an axially movable ring splined to the hub, a friction clutch element movable to engage the member to be engaged by the clutch ring and in advance thereof, and means carried by the hub for shifting the friction clutch element into engagement including resiliently mounted toggle mechanism, said toggle mechanism being mounted in the recesses of the hub and controlled by frictional engagement of the positive clutch ring therewith.

3. In a transmission mechanism having a driving member and a driven member, a positive clutch device including a hub fixed to one of said members and an axially movable clutch ring splined to said hub and engageable with the other member than that to which the hub is fixed, said hub having recesses therein open at one end to the member to be clutched, an axially shiftable friction clutch element intermediate the hub and the member which the friction clutch ring is moved into engagement with, and means housed in the hub for shifting the friction clutch element into engagement ahead of the positive clutch ring, said means including toggle mechanisms housed in the recesses in the hub and engaged with the hub, the clutch ring and the friction clutch element, the movement of the ring controlling the position of the toggle mechanisms.

4. In a transmission mechanism having a driving member and a driven member, a hub fixed to the driven member having radially extending recesses therein open toward the driving member, a friction clutch plate adjacent the open end of the hub recesses, toggle mechanism extending axially in each hub recess and engaging the hub at one end and the clutch plate at the other end, resilient means in the recesses normally urging the toggle mechanism outwardly at the pivot, and an axially shiftable clutch ring telescoping the hub and in engagement with the toggle mechanisms, said ring being splined to the hub and positively engageable with the driving member, the sliding movement of the ring controlling the actuation of the toggle mechanism.

5. In a transmission mechanism having a driving member and a driven member, a hub fixed to the driven member; a shiftable clutch ring splined to the hub and positively engageable with the driving member; a friction clutch plate intermediate the hub and the driving member; means in the hub for actuating the plate to engage the driving member in advance of the clutch ring comprising two diametrically disposed mechanisms each comprising a pair of endwise disposed levers, a shaft about which the adjacent ends of said levers can rock, spring means supporting the shaft, and a roller on the shaft engaging the clutch ring; and means on said ring for changing the position of the roller radially, the remote ends of said levers being anchored one to the hub and the other to the plate.

6. In a transmission mechanism having a driving member and a driven member, a hub fixed to the driven member, a shiftable clutch ring splined to the hub and positively engageable with the driving member, a friction clutch plate intermediate the hub and the driving member, said ring member having recesses in the inner face thereof, and pairs of means in the hub for shifting the clutch plate into engagement with the driving member in advance of the clutch ring each comprising a pair of endwise disposed toggle levers, an end of one lever engaging the hub and an end of the other lever engaging the clutch plate, a floating shaft intermediate the adjacent ends of said levers, a coil spring engaging the levers and urging the shaft radially outwardly, and a roller on the shaft engaging the clutch ring and registerable with one of the recesses therein, the recesses being located to allow alignment of the levers prior to engagement of the ring with the driving member and thus applying the friction plate through increasing the length of the toggle mechanism.

7. In a transmission mechanism having a driving member and a driven member, the driving member having a friction ring projecting from one end, a hub fixed to the driven member, a shiftable clutch ring splined to the hub and engageable positively with the driving member, a friction plate mounted in a complementary recess in the end of the hub adjacent the driving member said plate having a pair of diametrically extending arms engageable with the friction ring on the driving member, toggle mechanism in the hub and engaging the plate, and means engaging the toggle mechanism to normally lengthen the same and thereby shift the friction plate axially against the ring on the end of the driving member, said means being controlled by the clutch ring.

8. In a transmission mechanism having a driving member and a driven member, a hub fixed to the driven member, an axially shiftable clutch ring splined to the hub and engageable positively with the driving member, an axially shiftable friction plate mounted in a recess in the end of the hub adjacent the driving member and having a limited rotation relative to the hub, said plate having a pair of diametrically extending arms, a pair of toggle mechanisms in the hub each having a single point connection with an arm of the clutch plate and a two point connection with the hub, and means for lengthening the toggle mechanisms during the initial axial shifting of the clutch ring to engage the friction plate with the driving member prior to engagement of the clutch ring with the driving member.

9. In a transmission mechanism having a driving member and a driven member, a hub fixed to the driven member, an axially shiftable clutch ring splined on the hub and engageable positively with the driving member, an axially shiftable friction plate having a limited rotational relation with the end of the hub adjacent the driving member, a pair of toggle mechanisms in the hub each including two articulated levers, one of the levers having a single point anchorage with the clutch plate and the other lever having a two point anchorage with the hub, and means associated with the toggle mechanisms and the clutch ring for aligning the toggle levers during initial shifting movement of the clutch ring, the relative rotation of the plate and the clutch ring while the levers are aligned skewing the toggle mechanisms to increase the pressure thereof against the clutch plate.

10. In a transmission mechanism having a driving member and a driven member, a hub fixed to the driven member, an axially shiftable clutch ring splined on the hub and engageable positively with the driving member, an axially shiftable friction plate intermediate the hub and the driving member, toggle mechanisms in the hub for shifting the plate into frictional engagement with the driving member prior to engagement thereof by the clutch ring, said mechanisms each including a pair of levers having adjacent ends formed to limit the articulation thereof, and means controlled by said clutch ring for actuating the toggle mechanisms.

11. In a transmission mechanism having a driving member and a driven member, an axially movable positive clutch member associated in driving relation with one of said members and engageable with the other of said members, an axially movable friction element between the driving and the driven members, and spring mounted toggle means carried by the driven member and engageable with the friction element to move it into engagement with the driving element, said toggle means being extensible toward the driving member and actuated by the positive clutch member in its movement toward engaged position.

ROBERT N. BROWN.